W. Green.
Potato Digger.

N° 97,630. Patented Dec. 7, 1869.

Witnesses:
C. A. Pettit
S. C. Kenion

Inventor:
W. Green
by Munn & Co.
Attys

United States Patent Office.

WILLIAM GREEN, OF HOLLY, MICHIGAN.

Letters Patent No. 97,630, dated December 7, 1869; antedated November 27, 1869.

IMPROVEMENT IN POTATO-DIGGERS.

The Schedule referred to in these Letters Patent and making part of the same.

*To all whom it may concern:*

Be it known that I, WILLIAM GREEN, of Holly, in the county of Oakland, and State of Michigan, have invented a new and improved Potato-Digger; and I do hereby declare that the following is a full, clear, and exact description of the construction and operation of the same, reference being had to the accompanying drawings, making a part of this specification, in which—

Figure 1:
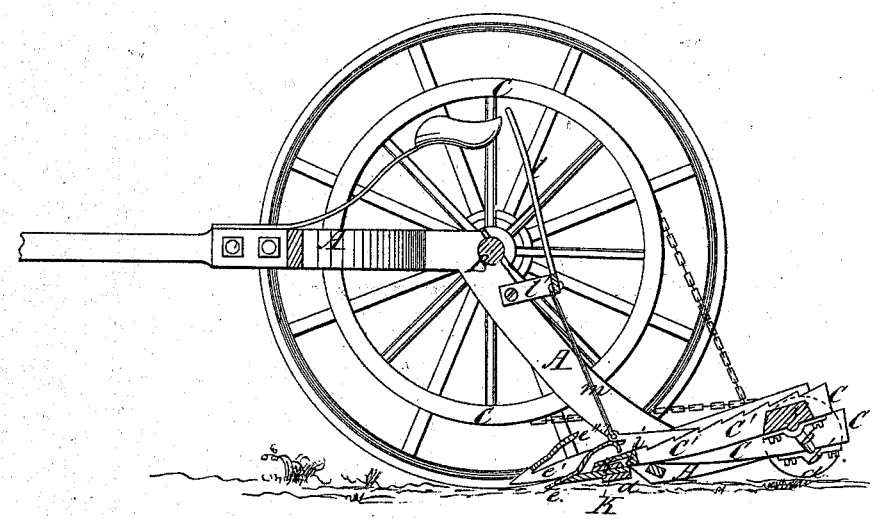
Figure 1 is a section through line $x$ $x$, fig. 2.
Figure 2:
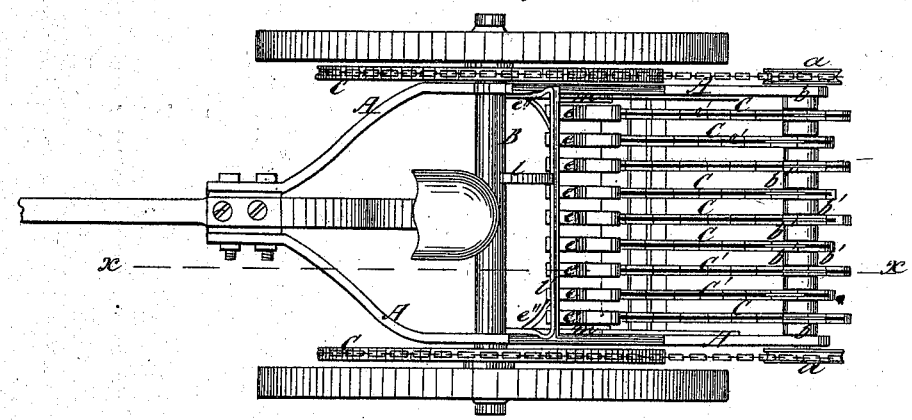
Figure 2 is a top view.

This invention relates to a frame mounted upon two wheels, the central part of the frame being bent downward from the axle, and the rear part sustaining the digging and separating-apparatus.

The invention consist in a series of narrow spades, projecting from the front side of the aforesaid apparatus, each spade rising above and being curved over upon one of the conveying-bars, by which the vines are carried to the rear; also, in a device for pressing potato-tops inward and away from the wheels and sides of the apparatus; also, in providing the conveying-bars with longitudinal slots and recesses in their forward ends and under sides, for the reception of certain projections on the upper side of the front bar of the apparatus, by means of which said bars are retained in place.

In the drawings—

A A represent the frame, mounted upon the axle B, and bent down in rear of the axle, and then carried straight back again, the rearmost portion supporting the digging and conveying-apparatus.

This apparatus is operated by the two wheels C C, made fast to the axle, one on each end, from which chains lead to smaller wheels $a$ $a$, one on each end of the shaft $b$, placed in the extreme rear end of the frame A A.

The shaft consists of a series of reversed cranks, $b'$ $b'$, &c., each of which sustains the rear end of a serrated bar, $c$, called, from its function, a conveying-bar.

The forward ends of the conveying-bars rest upon the front bar $d$, which connects the side frames A A.

The revolution of the crank-shaft $b$ converts the aggregate motion of the conveying-bars into a pushing tendency to the rear, in a manner well understood.

The digging-apparatus consists of a series of spades, $e$ $e$, &c., supported upon studs projecting from the bar $d$, said spades rising above and curving over upon the conveying-bars, so as to deposit upon them the whole mass of earth, tops, and potatoes dug up by the spades as the apparatus is drawn along. Lodged there, the mass is shaken by the action of the bars $c$, the earth in a great measure falling between the bars, and the potatoes and tops being borne to the rear, and left behind on the ground.

Two bars, $e'$ $e'$, are pivoted at their rear ends upon the inner sides of the frames A A, their forward ends projecting beyond the frame, and being pointed, and having prongs $e''$ inclined inward and backward, the office of which is to thrust the potato-tops out of the path of the wheels, and away from the sides of the apparatus, that these parts may not become clogged therewith.

The conveying-bars are slotted longitudinally, as shown at $c'$ $c'$, &c., and near their forward ends, and in their under sides, they have recesses $i$, which receive pins $k$, projecting from the upper side of the bar $d$, by means of which pins and recesses the bars are kept in place, and yet may be moved to one side a little, if desired.

The diggers may be lifted clear of the soil by means of a lever, $l$, sticking up from a bar, $l'$, which latter has two arms at each end, by means of which it is pivoted to the frames A, and is connected with the front bar $d$ of the digging-apparatus by rods $m$ $m$.

Having thus described my invention,

What I claim as new, and desire to secure by Letters Patent, is—

1. The spades $e$, in combination with the conveying-bars $c$, as and for the purpose described.

2. The bars $c$, provided with the longitudinal slots $c'$ and the recesses $i$, in combination with the pins $k$, as and for the purpose described.

WILLIAM GREEN.

Witnesses:
SAMUEL GREEN,
N. GREEN.